June 26, 1956 — A. N. A. AXLANDER — 2,751,925
AUTOMATIC AIR RELIEF DEVICE
Filed April 23, 1952
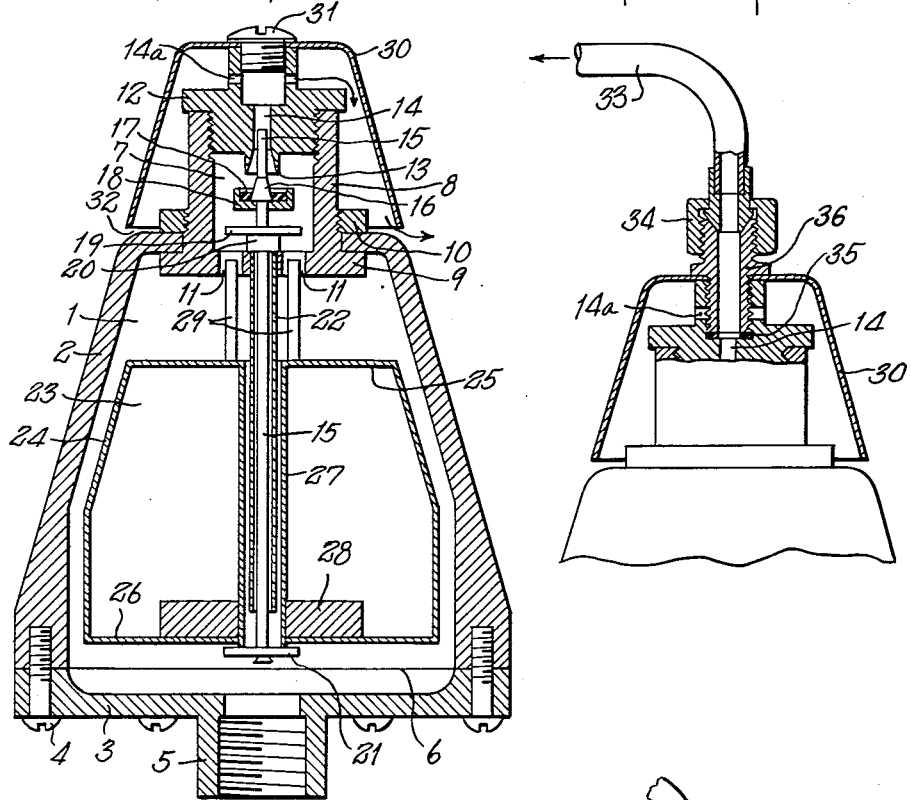
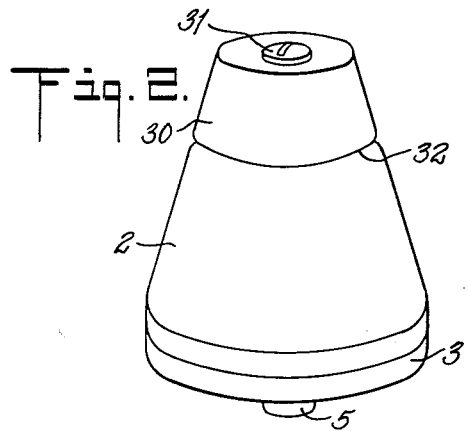
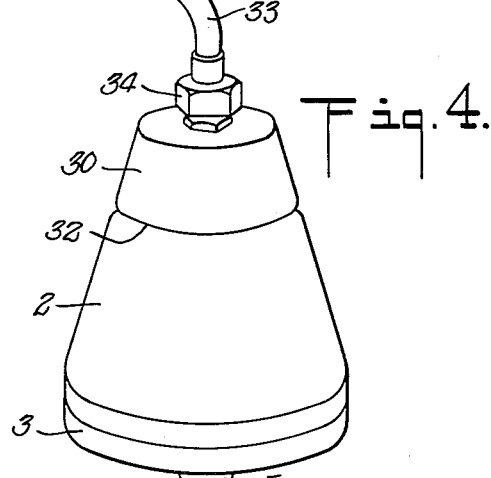
INVENTOR.
AXEL NORE ALEXANDER AXLANDER
BY Davis, Hoxie & Faithfull
ATTORNEYS

2,751,925
AUTOMATIC AIR RELIEF DEVICE

Axel Nore Alexander Axlander, Stocksund, Sweden

Application April 23, 1952, Serial No. 283,897

3 Claims. (Cl. 137—202)

This invention relates to an automatic air relief device suitable for use in a liquid system, such as hot water piping, requiring the automatic discharge of unwanted gas.

In order to obtain the highest efficiency in hot water heating installations, it is necessary that air cushions be removed from pipings, coils, etc. These cushions prevent circulation of the water and result either in less heat being available, or in a prohibited heating effect in certain parts of the installation. In those parts of the hot water system where the heat is diminished, the heater may be damaged by freezing. Such damage may cause long work interruptions and be rather costly and difficult to repair.

In a hot water system, it is therefore of great importance that the air separated from the circulating water be removed by an air relief device. For this reason, the pipes carrying the circulating water are placed in position with a pitch so that the air may rise to certain high points in the system. These high points are generally furnished with air domes in which the air can accumulate without disturbing the water circulation. Such places are frequently equipped with manually operated air valves.

It will be readily appreciated that manual de-airing is time consuming, especially in large installations where the devices are spread over vast areas. There is also the risk that one of the valves will be forgotten, with concomitant damages to the surrounding property.

Various forms of automatic air relief devices have been proposed and used heretofore, but these devices have not proven entirely reliable, either by not letting out the accumulated air or by letting out water with the air. In most of these devices the movements of the float and the valve are small in magnitude. Coupled with this, the volume of air separated from the water is normally rather inconsiderable, and so the valve operates with a very small opening and small movements. The small opening frequently fills with dirt, etc., so that the valve is apt to stick, making performance unreliable.

An automatic air relief device constructed in accordance with the present invention operates on a new principle. The device lets out a certain volume of the air, whereupon it closes completely. When the accumulated air has again reached a predetermined volume, the device opens fully and lets the air out. This cycle is repeated as required by local conditions. The valve thus operates intermittently and is kept open only for the time required to permit the accumulated air to escape from the device. The air relief device thus moves directly from fully opened to fully closed and vice versa. This arrangement prevents the device from sticking in a position between opened and closed.

The new effect is obtained by an arrangement in which the float operating the relief valve does not actuate it during the greater part of the float movement. Only in the near-upper position of the float does it close the relief valve when the float is rising, and only in its near-lower position does the float open the relief valve as the float is sinking. When the valve is forced to close by the rising float, and the float thereafter sinks back due to the accumulating air, the valve is kept closed by the pressure in the pipes not only until the float has sunk to a certain limit, but until its weight has overcome the closing effect of the inside pressure on the air relief valve, which is then suddenly opened.

A better understanding of my invention may be had from the following description taken in conjunction with the accompanying drawing, in which Fig. 1 is a vertical sectional view of a preferred form of the new automatic gas relief device;

Fig. 2 is a reduced perspective view of the device shown in Fig. 1;

Fig. 3 is a partial sectional view of a modified form of the device and

Fig. 4 is a reduced perspective view of the device shown in Fig. 3.

For purposes of illustration, the invention will be described in connection with a hot water installation, although it will be understood that it may be employed in any system requiring automatic exhaustion of a gas. Referring now to Figs. 1 and 2 of the drawing, the automatic air relief device there shown contains an enclosed float chamber 1. The volumetric capacity of this chamber is substantially defined by a hollow casting 2, and a bottom plate 3 secured to the casting by any suitable means, such as machine screws 4. As will be seen, casting 2 has an outer shape in the form of a truncated cone, the cone narrowing upward toward the top and terminating in an opening for receiving a valve member shown generally at 8. In the bottom plate 3 is an inlet port 5 internally threaded so as to enable the entire device to be mechanically secured to any pipe or other locus from whence gas and liquid components are derived. For example, inlet port 5 may be connected to any point in a hot water installation from whence it is desirable to remove accumulated air. In the region of the bottom of the casing is a strainer 6, the purpose of which is to prevent solid material from entering the float chamber proper from the inlet port 5. It is, of course, equally feasible to place the strainer 6 within the inlet port 5.

The housing for valve member 8 comprises a hollow cylindrical jacket having a perforated partition 9 forming the bottom of the housing, and a removable plug or lid member 12, the whole defining a cylindrical recess 7. The bottom 9 of the housing contains a central hole located between two holes 11, the latter holes being located equidistantly from the center hole. The holes 11 provide communication between the chamber 1 and the recess 7 of the housing. A protruding flange on partition 9 fits under the shoulder forming the opening in the top of the casting 2, the protruding flange being held fast against the shoulder by means of a clamp ring 10 screwed on the cylindrical member 8. Valve member 8 contains an outlet passage communicating with the interior of the chamber 1, and outlet openings connected to this passage for providing a conduit from the passage to the ambient atmosphere. In the embodiment shown in Figs. 1 and 2, the outlet passage is a central bore 14 terminating at its lower end in a circular valve seat 13. The upper end of bore 14 includes an enlarged tapped hole, in the walls of which are drilled one or more outlet openings 14a for the outgoing air.

The active parts of valve member 8 are built around a valve stem 15 mounted for reciprocation within the central bore 14. The stem has a smaller diameter than that of the bore so as to permit the air components to escape therebetween, as shown in the drawing. Near the top portion of the stem is a guiding cone 16, the larger diameter of which is surrounded by a packing member comprising a packing 17 enclosed in a holder 18. The purpose of the packing member is to seal the opening to passage 14, when the valve is in the closed position against the seat 13. The valve member 8 is opened and closed by means comprising a pair of butting plates or devices 19 and 21, and actuating projections 29. The two butting plates are spaced from each other on the valve stem, upper butting plate 19 being secured to a hub 20 and to the stem 15, while lower butting plate 21 is mounted on the stem by upsetting or enlarging the lower end of the stem. It will be noted that lower butting plate 21 thus may be displaced vertically upward on the stem, while movement vertically downward is arrested by the enlarged bottom of the stem.

In the center hole of partition 9, a depending protective tube 22 is secured in any suitable manner, the tube enclosing valve stem 15 with a clearance. The tube 22 extends down into the enclosed float chamber 1, as shown in the drawing, and is open at the bottom. Within the float chamber 1 is a hollow float 24 having two circular ends 25 and 26 and a central vertical tube 27. Tube 27 extends beyond the bottom end 26 so as to form a projection. Float 24 has the general configuration of a truncated cone. The annular interior space 23 of the float is hermetically sealed. The cavity 23 may contain a weighing medium to provide the most suitable weight for the float to satisfy local operating conditions. For example, cavity 23 may be filled with air, or partially filled with a suitable liquid, small lead shots, sand or a weight 28. The float is guided for vertical displacement on tube 22.

The top portion of the device is covered by a hood 30 having the general shape of a truncated cone fixed to the valve housing, as by means of a screw 31 positioned in the enlarged tapped hole formed in outlet passage 14. The outside of the hood forms a continuation of the outside of the hollow chamber casting 2. The bottom edge of hood 30 and the top of chamber 2 define a slot 32 for the outgoing gas component, as shown by the arrows in Fig. 1.

In the embodiment shown in Figs. 3 and 4, I employ a somewhat different arrangement for use when the outgoing gas contains components which are either harmful or objectionable to those persons in the immediate proximity of the device. A fitting is screwed into the valve member 8 so as to close the outlet openings 14a, while permitting communication with the outlet passage 14. The fitting comprises a hollow stud 36 and a surrounding collar 34 connecting the stud to a tube 33. The stud 36 is externally threaded so as to fit into the enlarged tapped hole in passage 14, and is provided with a shoulder for retaining hood 30 in position on the valve housing. The stud 36 is tightened against a gasket 35 positioned at the bottom of the enlarged tapped hole. The exhaust pipe or tube 33 communicates with the outlet passage 14 through the connection thus described.

The operation of the automatic air relief device is as follows. In order to facilitate the explanation, let it be assumed that the inlet port 5 is connected to a pipe in a hot water installation, from which pipe it is desired to expel the accumulated air. The initial position of the device is shown in Fig. 1, with the chamber 1 empty. In this position, the float defines a "first position." The air in the system passes in through the inlet 5 and around float 24, enters holes 11, continues through air passage 14 and outlet openings 14a, and passes under hood 30 via slot 32 to the open air. When a sufficient volume of air has thus been released, the water starts pouring into the chamber 1 from inlet 5, and the float 24 begins to rise. At first, the valve stem 15 does not immediately move from the first position shown in Fig. 1. The float continues to rise until the actuating projections or pins 29 strike the under side of the upper butting plate 19. As the float continues to rise above this striking position, the vertical movement of the float is imported to the valve stem 15 through plate 19. The extreme upper vertical displacement of the float is reached when the packing 17 is pressed against the slot 13, thus closing the outlet passage 14 and preventing further escape of the air. This position of the float is its "second position."

Since the air cannot now escape from the enclosed chamber 1, it accumulates in the upper portion of the chamber displacing water from the chamber through outlet 5. The float 24 now slowly sinks, but no movement is imparted to the valve stem 15 at this time. Outlet passage 14 remains closed, sealed by packing member 17, under the action of the air pressure within housing recess 7. As the float continues to sink further, the projecting bottom of tube 27 strikes against lower butting plate 21. The float is then held against further sinking despite the continued falling of the water level within the chamber 1. However, as the water level falls lower and lower, the force of the weight 28 is increasingly felt upon the lower butting plate 21, until ultimately the downward force upon butting plate 21 overcomes the upward force of the air pressure against packing member 17, thus releasing it with a jerk from its sealing position on the valve seat 13. The valve stem 15 now sinks rapidly until hub 20 strikes the top of partition 9, as shown in Fig. 1. The outlet passage is now open, and the air within the enclosed chamber 1 streams out through openings 14a to the ambient atmosphere, and the above described movements of the device are begun anew.

It is important in automatic gas relief devices of the kind described that the valve close at precisely the right moment, and that water splashing does not occur. It has been found empirically that water splashing can be avoided if the inner volume of the valve housing 8 is below a certain limit, as compared with the volume of air enclosed by the float chamber 1 at the closing of the valve. The placing of the valve housing above the chamber 1, and their partial separation by the perforated partition 9, also contribute toward preventing water splashing.

In those applications of the device where the water streams slowly in inlet port 5, the height of the float should be fixed by the level of the water surface, so that at a certain desired level the valve will close. However, this latter application will rarely, if ever, occur since in the practical situation, the water or other liquid component streams rapidly into the chamber under a velocity determined by the pressure in and width of the space between the valve stem 15 and the walls of the outlet passage 14, and also the pressure drop caused by strainer 6. The water thus has a certain motion and can produce a velocity head acting upwards when the water is streaming into the float chamber, both on the lower butting plate 21 and the lower float end 26. Also, when passing upward around the jacket of the float, the water causes by friction a lifting effect. By this velocity effect, the float and valve are lifted for closing sooner than they would be merely by the level of the water when rising slowly. The valve, so to speak, closes somewhat too early. This means that, when the valve has closed, the float will immediately sink back a bit. The friction between the butting pins 29 and the upper butting plate 19 ceases and the stem 15, with the attached devices, is not influenced by any other forces than the inside pressure in the valve housing and the float chamber. Without this effect, the butting pins would, after the closing, rub against the upper butting plate and make the closing unreliable.

In cases of a high water pressure, it may be useful to put a strainer in the fitting 5 and provide it with small openings. It will then act as a throttling disc, preventing a too pronounced action due to the velocity of the water pouring into the float chamber 1.

Adjusting of the valve must be done with regard to the static water pressure. If the tightening edge of the valve seat 13 defines a surface of $a$ mm.$^2$, and if the weight of the stem is g gram, the weight of the float G gram, and the pressure in the valve housing P m water, then the weights g and G should comply with the conditions:

$$g = a \times P \text{ min.} \quad G + g = a \times P \text{ max.}$$

From these equations, g and G can be calculated for the pressure limits within which the device can be used.

It is not necessary that the device be designed as a cylindrical body. The design could be made in many different ways within the scope of the invention. Neither must the float 23, as in the above example, act directly on the stem 15. Its force and motion may be transferred to the valve stem by means of levers or the like. The holes 11 in the bottom 9 of the valve housing may be replaced by some other equivalent means, and so may the butting pins 29. Many other embodiments are possible within the scope of the invention.

I claim:

1. An automatic air relief device for use in liquid systems, which comprises the combination of a hollow member forming a float chamber and having an inlet opening for admitting liquid and air into the chamber, said member also forming a valve sub-chamber above said float chamber, a perforated partition separating said sub-chamber from the float chamber, the sub-chamber having an outlet for exhausting air from said chambers, an air relief valve in the sub-chamber controlling flow through said outlet, a float in the float chamber movable vertically relative to the valve, the air relief valve including a stem extending downward into the float chamber, a tube depending from said partition and surrounding the valve stem, a central tube in the float surrounding and guided by said depending tube, means including an upper abutment on the stem within the sub-chamber for establishing an operative connection through said partition and between the stem and the float to close the valve upon rising the float, the valve being held in its closed position by the air pressure in the sub-chamber and means including a lower abutment on the stem in the float chamber below the float for establishing an operative connection between the stem and float to open the valve against said air pressure upon downward movement of the float, said abutments being spaced apart sufficiently to permit a free movement of the float between the abutments, said depending tube preventing movements of the float from being transmitted to the valve stem otherwise than through said abutments.

2. A device according to claim 1, comprising also a hood secured to the hollow member and forming a space to which said outlet leads, the hood also forming with the hollow member a slot for discharging air from said space.

3. A device according to claim 1, comprising also a hood secured to the hollow member and forming a space to which said outlet leads, the hood also forming with the hollow member a slot for discharging air from said space, the hood and the hollow member forming together a truncated cone.

References Cited in the file of this patent

UNITED STATES PATENTS

| | | |
|---|---|---|
| 565,457 | Harttert | Aug. 11, 1896 |
| 926,968 | Stickdorn | July 6, 1909 |
| 1,200,764 | Schneible | Oct. 10, 1916 |
| 1,536,686 | Mullen et al. | May 5, 1925 |
| 2,179,750 | McCracken | Nov. 14, 1939 |
| 2,243,262 | Smith | May 27, 1941 |
| 2,251,086 | Van Dyke et al. | July 29, 1941 |
| 2,381,626 | Thiel | Aug. 7, 1945 |
| 2,489,461 | Parrish | Nov. 29, 1949 |

FOREIGN PATENTS

| | | |
|---|---|---|
| 24,278 | France | Jan. 17, 1922 |